(12) United States Patent
Atz et al.

(10) Patent No.: US 9,228,488 B2
(45) Date of Patent: Jan. 5, 2016

(54) HIGH PRESSURE TURBINE INLET DUCT AND ENGINE

(71) Applicant: GENERAL ELECTRIC COMPANY, Schenectady, NY (US)

(72) Inventors: Charles B Atz, New Castle, PA (US); John Dowell, Grove City, PA (US); Vijayaselvan Jayakar, Bangalore (IN); Pratap Subhash Shitole, Bangalore (IN); Cain Piotrowski, Canton, MI (US); Trent A Larson, Rochester, MI (US); Edward Phaneuf, Madison Heights, MI (US); Abhijeet Warale, Auburn Hills, MI (US); Shirish Bhide, Troy, MI (US)

(73) Assignee: General Electric Company, Schenectady, NY (US)

( * ) Notice: Subject to any disclaimer, the term of this patent is extended or adjusted under 35 U.S.C. 154(b) by 325 days.

(21) Appl. No.: 13/925,091

(22) Filed: Jun. 24, 2013

(65) Prior Publication Data

US 2014/0190164 A1    Jul. 10, 2014

Related U.S. Application Data

(60) Provisional application No. 61/749,477, filed on Jan. 7, 2013.

(51) Int. Cl.
| | |
|---|---|
| *F02B 33/44* | (2006.01) |
| *F02B 33/00* | (2006.01) |
| *F15D 1/04* | (2006.01) |
| *F02B 37/00* | (2006.01) |
| *F02B 37/02* | (2006.01) |

(52) U.S. Cl.
CPC ............... *F02B 37/004* (2013.01); *F02B 37/02* (2013.01); *Y02T 10/144* (2013.01)

(58) Field of Classification Search
CPC .... F02B 37/001; F02B 37/004; F02B 37/007; F02B 37/013; F02B 37/02; F02B 61/04; F01N 13/08; F01N 13/1822; F01N 2470/10; F01N 2470/20; Y02T 10/144
USPC ..................... 60/612; 123/562; 138/37, 39, 42
See application file for complete search history.

(56) References Cited

U.S. PATENT DOCUMENTS

| | | | | | |
|---|---|---|---|---|---|
| 411,864 | A | * | 10/1889 | Leaycraft | 138/39 |
| 1,467,168 | A | * | 9/1923 | Kaplan | 138/37 |
| 1,955,070 | A | * | 4/1934 | Jessop et al. | 138/37 |
| 2,060,101 | A | * | 11/1936 | Moody | 60/696 |
| 3,623,511 | A | * | 11/1971 | Levin | 138/39 |

(Continued)

FOREIGN PATENT DOCUMENTS

| | | | | |
|---|---|---|---|---|
| DE | 19855805 A1 * | 6/2000 | | F02M 35/104 |
| DE | 10205754 A1 * | 8/2003 | | F02M 35/10 |

(Continued)

*Primary Examiner* — Thai Ba Trieu (74) *Attorney, Agent, or Firm* — GE Global Patent Operation; John A. Kramer (57) ABSTRACT

A duct for connection between an exhaust manifold and a high-pressure turbine inlet include a cylindrical duct body defining a longitudinal axis. A frustoconical outlet nozzle connected at one end of the duct body and extending at about eighty-five degrees from the longitudinal axis. The duct further includes an inlet bell connected at the other end of the duct body and extending at about fifty degrees from the longitudinal axis.

17 Claims, 5 Drawing Sheets

(56) References Cited

U.S. PATENT DOCUMENTS

| | | | | |
|---|---|---|---|---|
| 3,625,820 A * | 12/1971 | Gluntz | ............... | F04F 5/46 376/372 |
| 4,146,195 A * | 3/1979 | Brooks | ............... | 406/190 |
| 4,779,586 A * | 10/1988 | White, Jr. | ............... | 123/198 E |
| 4,986,732 A * | 1/1991 | Stock et al. | ............... | 285/179 |
| 5,109,674 A * | 5/1992 | Sudmanns | ............... | 60/612 |
| 5,288,111 A * | 2/1994 | Storf et al. | ............... | 285/179 |
| 5,692,378 A * | 12/1997 | Ramsden | ............... | 60/612 |
| 6,179,342 B1 * | 1/2001 | Shen | ............... | 285/179 |
| 6,499,770 B1 * | 12/2002 | Glista et al. | ............... | 285/223 |
| 6,951,354 B1 * | 10/2005 | Paulson | ............... | 285/179 |
| 7,032,383 B2 * | 4/2006 | Weber | ............... | 60/612 |
| 7,300,074 B1 * | 11/2007 | Paulson | ............... | 285/179 |
| 7,908,860 B2 * | 3/2011 | Trombetta et al. | ............... | 60/612 |
| 8,234,864 B2 * | 8/2012 | Easley et al. | ............... | 60/612 |
| 8,345,814 B2 * | 1/2013 | Ishida | ............... | F04F 5/464 376/372 |
| 2010/0146965 A1 * | 6/2010 | Easley et al. | ............... | 60/612 |
| 2011/0061757 A1 * | 3/2011 | Butler | ............... | 138/40 |
| 2012/0304653 A1 * | 12/2012 | Flanagan et al. | ............... | 60/740 |
| 2013/0008161 A1 * | 1/2013 | Flohr | ............... | 60/600 |
| 2013/0136574 A1 * | 5/2013 | Allaei | ............... | 415/1 |
| 2014/0182290 A1 * | 7/2014 | Bhide et al. | ............... | 60/612 |
| 2014/0318120 A1 * | 10/2014 | Svihla et al. | ............... | 60/599 |

FOREIGN PATENT DOCUMENTS

| | | | | |
|---|---|---|---|---|
| DE | 10317053 A1 * | 12/2004 | ............... | F01N 7/08 |
| FR | 2468017 A * | 5/1981 | ............... | F15D 1/04 |
| JP | 55109726 A * | 8/1980 | ............... | F02B 37/00 |
| JP | 55109727 A * | 8/1980 | ............... | F02B 37/04 |
| JP | 55109728 A * | 8/1980 | ............... | F02B 37/04 |
| WO | WO 2010005805 A2 * | 1/2010 | ............... | F02B 37/013 |

* cited by examiner

HIGH PRESSURE TURBINE INLET DUCT AND ENGINE

CROSS-REFERENCE TO RELATED APPLICATIONS

This application claims priority to U.S. provisional patent application Ser. No. 61/749,477 filed on Jan. 7, 2013, which is incorporated herein by reference in its entirety.

BACKGROUND

1. Technical Field

Embodiments of the invention relate generally to internal combustion engines, and more particularly to turbocharged engines. Other embodiments relate to diesel engines with multi-stage turbocharger arrangements.

2. Discussion of Art

Ships typically carry two types of diesel engines: main propulsion engines and auxiliary engines. Both types of engine generate emissions of PM 2.5 (diesel soot), SO2 (sulfur dioxide), and NOx (nitrous oxides). Some governmental agencies, however, have adopted standards that will limit engine emissions, particularly NOx. For example, some of these standards apply to engines installed on U.S. vessels and to marine diesel fuels produced and distributed in the United States.

NOx emissions vary according to engine speed, combustion temperature, and the quantity of fuel burned. Lower speeds and higher combustion temperatures tend to raise the amount of NOx produced per quantity of fuel burned. As will be appreciated, low speed and high combustion temperature can be desirable characteristics of high-load internal combustion engines such as marine diesel propulsion engines. Therefore, the simplest path for reducing NOx emissions is to reduce the quantity of fuel burned per unit of useful power.

Turbochargers can be useful for enhancing fuel efficiency of piston-cylinder engines, by augmenting the mass and pressure of air inhaled into each cylinder during its intake stroke. However, turbochargers for marine diesel engines can be difficult to fit into the machinery space provided for the engines and their interfacing equipment.

As will be appreciated, it is desirable to minimize the machinery space within large ships, which are built to carry cargo. Therefore, it is desirable to provide a marine diesel turbocharger arrangement that satisfies enhanced emissions standards while not requiring excessive machinery space.

BRIEF DESCRIPTION

In embodiments, a duct is provided for connection between an exhaust manifold and a high pressure turbine inlet. The duct includes a cylindrical duct body, which defines a longitudinal axis. A frustoconical outlet nozzle is connected at one end of the duct body and extends at from eighty to ninety degrees from the longitudinal axis. An inlet bell is connected at the other end of the duct body and extends at from forty-five to fifty-five degrees from the longitudinal axis. The inlet bell of the duct may be configured to receive one leg of an inlet/bypass manifold for connecting the duct with the exhaust manifold.

In embodiments, the duct is configured with features for mounting onto an integrated front end (IFE) structure of a marine diesel engine.

In embodiments, a diesel engine (e.g., a marine diesel engine) includes an exhaust manifold, an intake manifold, one or more cylinders arranged to receive intake air from the intake manifold and to discharge exhaust gas to the exhaust manifold, a turbocharger including a turbine coupled to receive exhaust gas from the exhaust manifold and including a compressor coupled to supply intake air to the intake manifold, and a turbine inlet duct coupled to conduct exhaust gas from the exhaust manifold to the turbine of the turbocharger. The turbine inlet duct includes a cylindrical duct body, which defines a longitudinal axis. A frustoconical outlet nozzle is connected at one end of the duct body and extends at from eighty to ninety degrees from the longitudinal axis. The frustoconical outlet nozzle is connected to the turbine. An inlet bell is connected at the other end of the duct body and extends at from forty-five to fifty-five degrees from the longitudinal axis. The inlet bell is connected to the exhaust manifold.

"Substantially," "about," and "generally," as used herein, are all relative terms indicating as close to the desired value as can reasonably be achieved within conventional manufacturing tolerances.

DRAWINGS

The present invention will be better understood from reading the following description of non-limiting embodiments, with reference to the attached drawings, wherein below:

FIG. 4, comprising views 4A-4B, shows a turbine inlet duct of the turbocharger duct arrangement shown in FIG. 3, according to an embodiment of the invention.

DETAILED DESCRIPTION

Reference will be made below in detail to exemplary embodiments of the invention, examples of which are illustrated in the accompanying drawings. Wherever possible, the same reference characters used throughout the drawings refer to the same or like parts.

Figure 1:
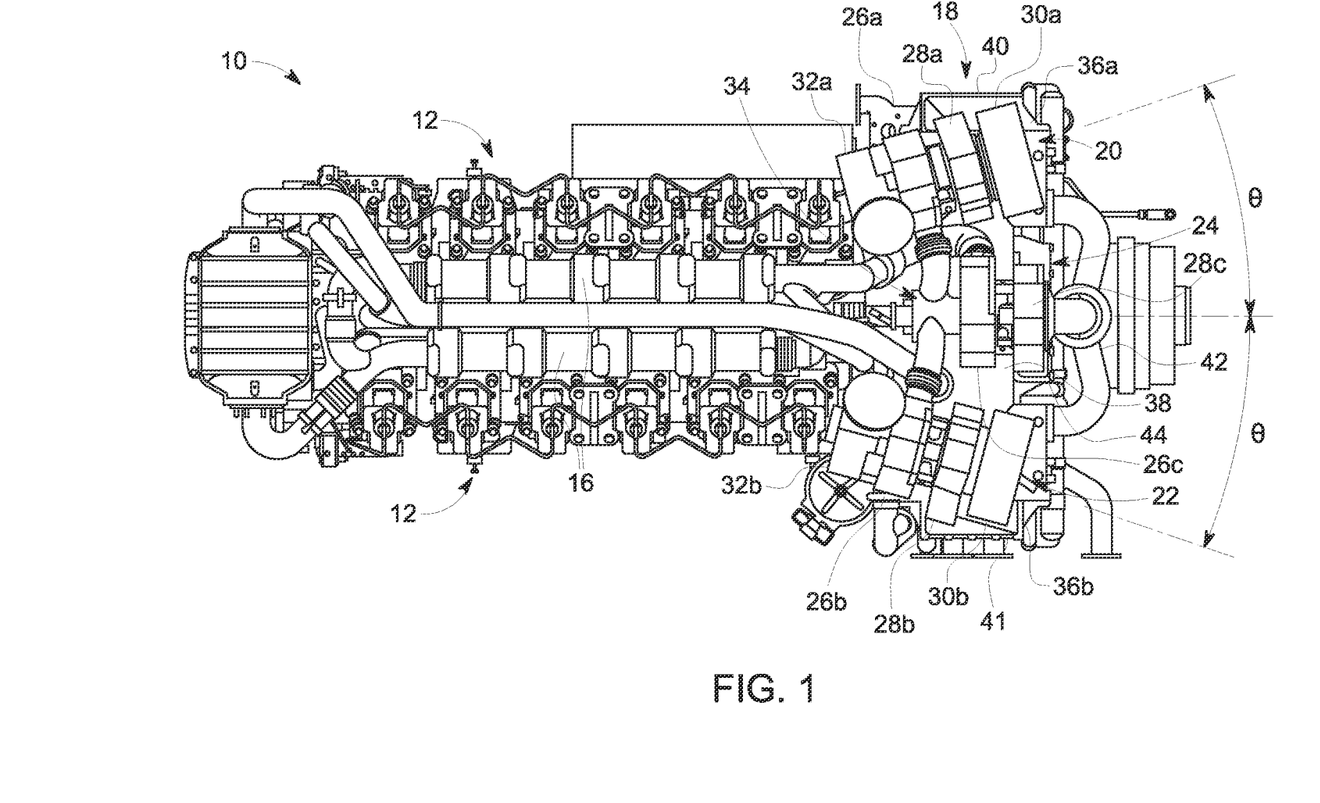
FIG. 1 shows in plan view a diesel engine (e.g., marine diesel engine) having a two-stage turbocharger arrangement.
Figure 2:
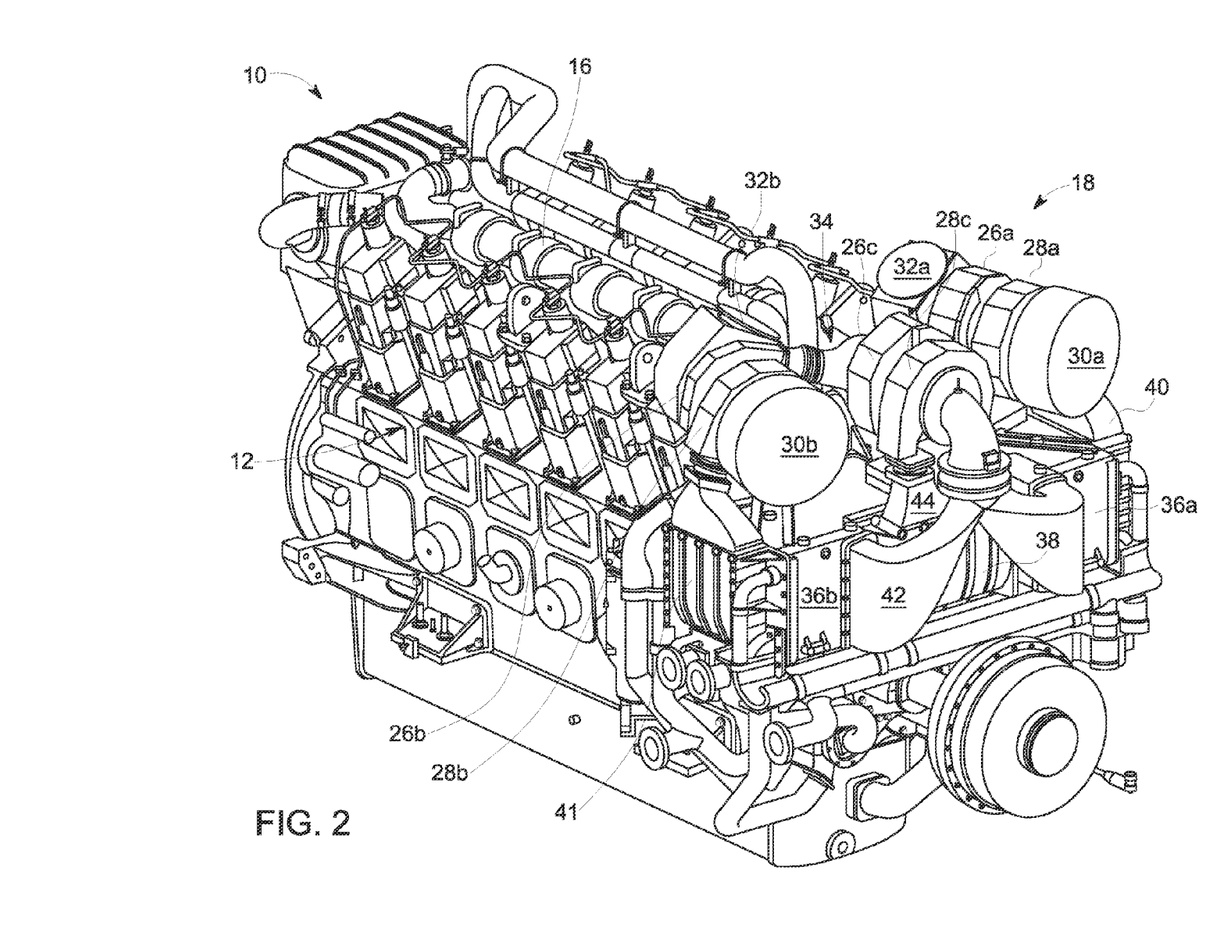
FIG. 2 shows in perspective view the diesel engine of FIG. 1.

FIGS. 1 and 2 show plan and perspective views of a diesel engine 10 (e.g., a marine diesel engine), which includes banks of cylinders 12. Each bank of cylinders receives intake air from an intake manifold (not shown) and discharges exhaust gases to an exhaust manifold 16. The intake manifold receives intake air that is charged to greater than atmospheric pressure by a two-stage turbocharger arrangement 18. The turbocharger arrangement 18 is driven by exhaust gas from the exhaust manifolds 16.

Figure 5:
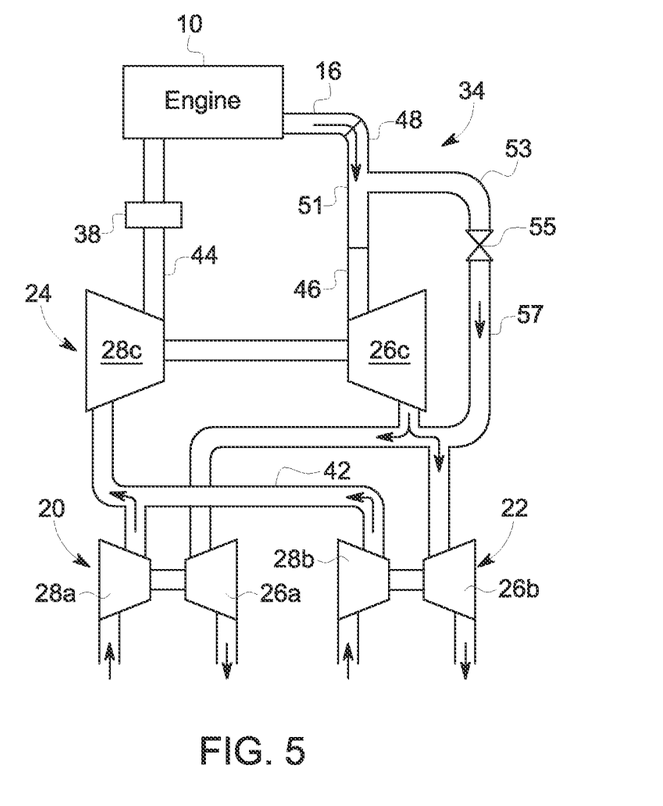
FIG. 5 schematically illustrates a flow arrangement of the two-stage turbocharger arrangement shown in FIGS. 1-2. (For clarity of illustration, not all components of the system/arrangement are shown in FIG. 5.)

The turbocharger arrangement 18 includes first and second low pressure (LP) turbochargers 20, 22 as well as a high pressure (HP) turbocharger 24. Thus, the turbocharger arrangement 18 is a two-stage arrangement, with the LP turbochargers providing a first stage of compression and a second stage of expansion, and the HP turbocharger providing a second stage of compression and a first stage of expansion. "High" pressure and "low" pressure refer to relative pressure levels at which the turbochargers operate, that is, the low pressure turbochargers operate at a lower pressure than the high pressure turbocharger, which operates at a higher pressure than the low pressure turbochargers. Each of the turbochargers 20, 22, 24 includes a respective turbine 26 (26a, 26b, 26c), which works on expansion of the exhaust gases, and a respective compressor 28 (28a, 28b, 28c), which works on compression of the intake air. That is, the respective turbine and compressor of each turbocharger are interconnected by a turbocharger shaft. The turbine is driven by exhaust gas, which causes the compressor to rotate for compressing intake air. The two LP turbochargers 20, 22 also include respective intake filters 30a, 30b and exhaust covers 32a, 32b. In operation, the turbines 26a, 26b, 26c receive exhaust gases from the exhaust manifold 16 via an inlet/interstage duct assembly (IIDA) 34, and the compressors 28a, 28b, 28c discharge intake air to the intake manifolds 14 via intercoolers 36a, 36b and an aftercooler 38. Intake air is communicated from each LP turbocharger compressor 28a, 28b to a corresponding intercooler 36a, 36b via an intercooler duct cover 40 or 41, is communicated from the intercoolers 36a, 36b to the HP compressor 28c via a compressor interstage duct 42, and is communicated from the HP compressor 28c to the aftercooler 38 via an aftercooler duct cover 44. FIG. 5 schematically illustrates an embodiment of a flow arrangement of the turbochargers 20, 22, 24. For reasons further discussed below, the HP turbocharger 24 is aligned in a vertical plane above a crankshaft axis of the engine 10, while the LP turbochargers 20, 22 are angled outward from the crankshaft axis at angles θ.

Figure 3:
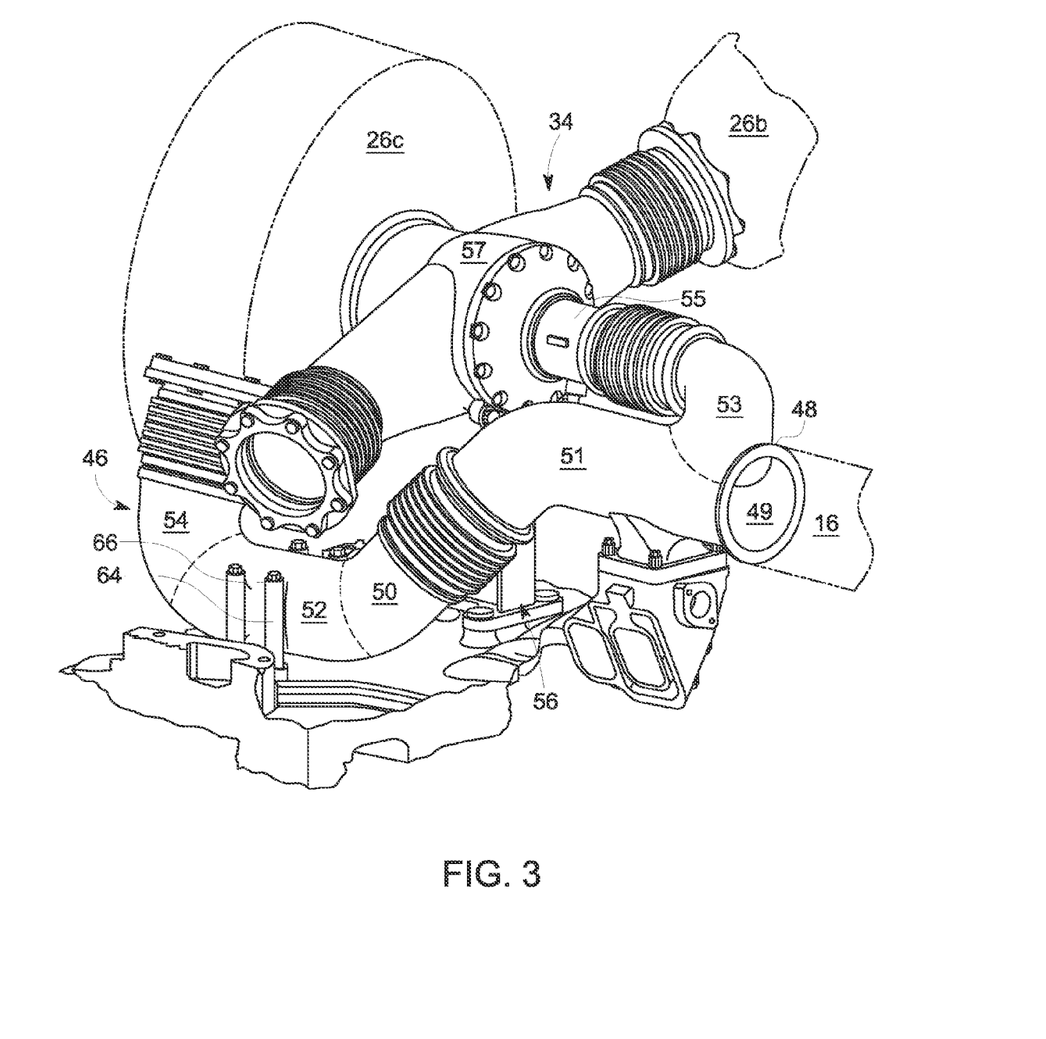
FIG. 3 shows in perspective view a turbocharger duct arrangement of the diesel engine shown in FIGS. 1 and 2.

Referring to FIG. 3, the IIDA 34 includes a HP turbine inlet duct 46 and an inlet/bypass manifold 48 that connects the HP turbine inlet duct 46 to the exhaust manifold 16. The inlet duct 46 includes an inlet bell 50, a duct body 52, and a frustoconical outlet nozzle 54. The inlet/bypass manifold 48 includes a throat 49, a first leg 51 that connects with the inlet bell 50 of the inlet duct 46, and a second leg 53 that connects via a bypass or choke valve 55 to an interstage duct 57. The throat 49, the first leg 51, and the second leg 53 all are of equal flow areas. The throat 49 is configured for connection to the exhaust manifold 16, and when the inlet/bypass manifold 48 is installed, the throat 49 is a connection point of the inlet/bypass manifold 48 to the exhaust manifold 16. The throat 49 also is configured for connection directly to a cylinder exhaust header, which cannot be accommodated on the exhaust manifold 16 due to relative positioning of the turbochargers 20, 22, 24 driving the inlet/bypass manifold 48 to be over the forward most cylinder of the engine 10. The bypass valve 55 is operable through a range of positions. In a first position of the bypass valve 55, all of the exhaust gas flows from the exhaust manifold direct to the HP turbine 26c, via the turbine inlet duct 46, and there is no bypass flow. In a second position of the bypass valve 52, a first (direct) portion of the exhaust gas flows (e.g., in one embodiment, at approximately 6.4 kg/s) through the turbine inlet duct 46 to the HP turbine 26c while a second (bypass) portion of the exhaust gas flows (e.g., at approximately 1 kg/s) through the bypass valve 55 into the turbine interstage duct 57.

Figure 4A:
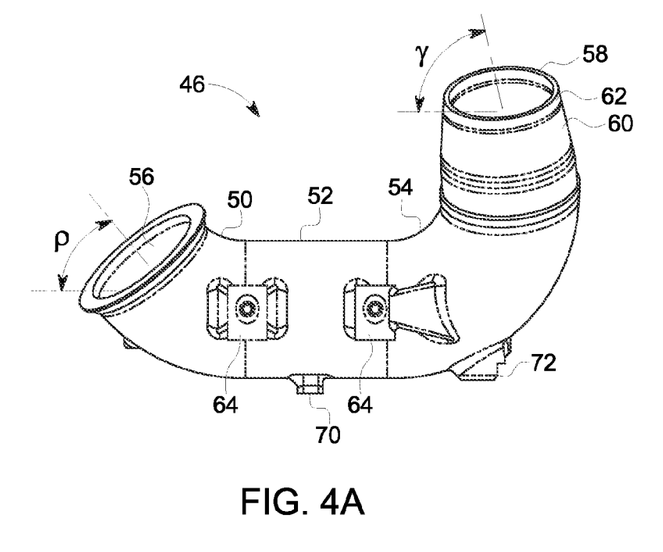
Figure 4B:
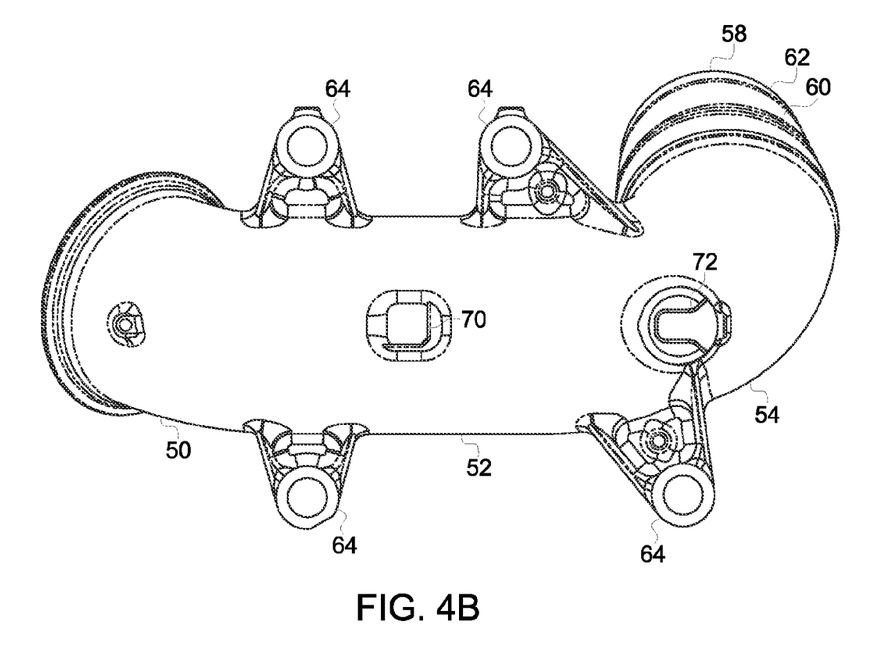

FIG. 4, which comprises views 4A, 4B, illustrates embodiments of the turbine inlet duct 46. In one embodiment, the inlet bell 50 is internally flared from a narrower passage through the duct body 52, to a wider bell mouth 56, for matingly receiving a corresponding externally tapered portion (not shown) of the inlet/bypass manifold 48. The outlet nozzle 54 is externally tapered from a wider base at the duct body 52 to a narrower tip 58, for matingly fitting into a corresponding internally tapered inlet (not shown) of the HP turbine 26c. The outlet nozzle 54 includes a first portion 60 that is tapered inward (relative to a central axis defined by the end/tip 58 of the outlet nozzle) by about eight and one half degrees, and also includes a second portion 62 that is tapered inward by about four degrees. The second portion 62 extends along the central axis of the outlet nozzle, about one quarter the distance of the first portion 60. The inlet bell 50 is angled away from an axis of the duct body 52 at an angle ρ for optimal insertion of the inlet/bypass manifold 48. In embodiments, the angle ρ is from fifty five (55) to forty five (45) degrees. For example, in one embodiment, the angle ρ is about fifty (50) degrees. The outlet cone 54 is angled away from the axis of the duct body 52 at an angle γ for optimal insertion into the HP turbine inlet. In embodiments, the angle γ is from eighty (80) to ninety (90) degrees. For example, in one embodiment, the angle γ is about eighty five (85) degrees. The axes of the outlet cone 54 and of the duct body 52 define a first plane, while the axes of the inlet bell 50 and of the duct body 52 define a second plane that is rotated (for example) about five (5) degrees counter clockwise from the first plane around the axis of the duct body. Thus, the arrangement of inlet bell 50, duct body 52, and outlet cone 54 allows for streamlined flow from the inlet/bypass manifold 48 to the HP turbine 26c.

The duct body 52 includes legs 64 that receive bolts 66 for mounting the HP turbine inlet duct 46 to a support (e.g., frame, cylinder block, cover, or other structure) of the engine 10, as shown in FIG. 3. The legs 64 extend orthogonal to a third plane that is rotated about twenty (20) degrees clockwise from the second plane around the axis of the duct body 52. The duct body 52 also includes two pegs 70, 72, shown in FIG. 4, that protrude from a lower surface of the duct body orthogonal to the third plane. The first peg 70 has a generally square shape while the second peg 72 has an elongated shape. The pegs fit into matching holes (not shown) formed on the integrated front end (IFE) cover of the engine 10. These constraint features enable enhanced control of forces/loads exerted on the HP turbine inlet duct 46. In particular, flow loads are transferred through the legs 62 and the pegs 70, 72 direct into the integrated front end (IFE) structure of the engine 10, thereby mitigating loading at the connections of the HP turbine inlet duct 46 to the HP turbine 26a and to the inlet/bypass manifold 48. Also, thermal strains are accommodated without buckling or tension in the duct body 52.

Thus, in embodiments, a duct is provided for connection between an exhaust manifold and a high pressure turbine inlet. The duct includes a cylindrical duct body, which defines a longitudinal axis. A frustoconical outlet nozzle is connected at one end of the duct body and extends at from eighty to ninety degrees from the longitudinal axis. An inlet bell is connected at the other end of the duct body and extends at from forty-five to fifty-five degrees from the longitudinal axis. The inlet bell of the duct may be configured to receive one leg of an inlet/bypass manifold for connecting the duct with the exhaust manifold.

In other embodiments, the duct includes a cylindrical duct body defining a longitudinal axis. A frustoconical outlet nozzle is connected at one end of the duct body and extends at about eighty five degrees from the longitudinal axis. The frustoconical outlet nozzle may include a first portion with its outer surface tapered inward at about eight and one half degrees, and a second portion with its outer surface tapered inward at about four degrees, the second portion disposed tipward from the first portion. The second portion may extend from the first portion to the tip of the frustoconical outlet nozzle, and the second portion may extend about one quarter the width of the first portion. An inlet bell is connected at the other end of the duct body and extends at about fifty degrees from the longitudinal axis. The outlet nozzle extends from the longitudinal axis in a first plane, and the inlet bell extends from the longitudinal axis in a second plane that is rotated around the longitudinal axis at about five degrees from the first plane. The inlet bell may extend from the longitudinal axis for a lesser distance than does the outlet nozzle.

In certain embodiments, legs are formed on the duct body and define holes with axes extending orthogonal to a third plane that is rotated around the longitudinal axis at about twenty degrees from the second plane. In certain embodiments, a first peg and a second peg protrude from a lower surface of the duct body orthogonal to the third plane. The first peg is square, while the second peg has an elongated cross-section.

In other embodiments, a diesel engine (e.g., a marine diesel engine) includes an exhaust manifold, an intake manifold, one or more cylinders arranged to receive intake air from the intake manifold and to discharge exhaust gas to the exhaust manifold, a turbocharger including a turbine coupled to receive exhaust gas from the exhaust manifold and including a compressor coupled to supply intake air to the intake manifold, and a turbine inlet duct coupled to conduct exhaust gas from the exhaust manifold to the turbine of the turbocharger. The turbine inlet duct includes a cylindrical duct body, which defines a longitudinal axis. A frustoconical outlet nozzle is connected at one end of the duct body and extends at from eighty to ninety degrees from the longitudinal axis. The frustoconical outlet nozzle is connected to the turbine. An inlet bell is connected at the other end of the duct body and extends at from forty-five to fifty-five degrees from the longitudinal axis. The inlet bell is connected to the exhaust manifold.

In other embodiments, a diesel engine (e.g., a marine diesel engine) includes an exhaust manifold, an intake manifold, one or more cylinders receiving intake air from the intake manifold and discharging exhaust gas to the exhaust manifold, a turbocharger including a turbine receiving exhaust gas from the exhaust manifold and including a compressor supplying intake air to the intake manifold, and a turbine inlet duct conducting exhaust gas from the exhaust manifold to the turbine of the turbocharger. The turbine inlet duct includes a cylindrical duct body defining a longitudinal axis. A frustoconical outlet nozzle is connected at one end of the duct body and extends at about eighty five degrees from the longitudinal axis. The frustoconical outlet nozzle may include a first portion with its outer surface tapered inward at about eight and one half degrees, and a second portion with its outer surface tapered inward at about four degrees, the second portion disposed tipward from the first portion. The second portion may extend from the first portion to the tip of the frustoconical outlet nozzle, and the second portion may extend about one quarter the width of the first portion. An inlet bell is connected at the other end of the duct body and extends at about fifty degrees from the longitudinal axis. The outlet nozzle extends from the longitudinal axis in a first plane, and the inlet bell extends from the longitudinal axis in a second plane that is rotated around the longitudinal axis at about five degrees from the first plane. The inlet bell may extend from the longitudinal axis for a lesser distance than does the outlet nozzle.

In certain embodiments of the diesel engine, legs are formed on the duct body and define holes with axes extending orthogonal to a third plane that is rotated around the longitudinal axis at about twenty degrees from the second plane. In certain embodiments, a first peg and a second peg protrude from a lower surface of the duct body orthogonal to the third plane. The first peg is square, while the second peg has an elongated cross-section.

Another embodiment relates to a system. The system comprises a duct, an engine having an exhaust manifold, a high pressure turbocharger operably coupled to the engine and comprising a high pressure turbine and a high pressure compressor, and at least one low pressure turbocharger operably coupled to the high pressure turbocharger. (The low pressure turbocharger operably coupled to the high pressure turbocharger means a compressor of the low pressure turbocharger is upstream of the high pressure compressor, with respect to a flow direction of inlet air, and a turbine of the low pressure turbocharger is downstream of the high pressure turbocharger, with respect to a flow direction of exhaust.) The duct comprises a cylindrical duct body defining a longitudinal axis, a frustoconical outlet nozzle connected at one end of the duct body and extending at from eighty to ninety degrees from the longitudinal axis (that is, a central axis of the frustoconical outlet nozzle is oriented at a first angle with respect to the longitudinal axis, where the first angle is from eighty to ninety degrees), and an inlet bell connected at the other end of the duct body and extending at from forty-five to fifty-five degrees from the longitudinal axis (that is, a central axis of the inlet bell is oriented at a second angle with respect to the longitudinal axis, where the second angle is from forty-five to fifty-five degrees). The inlet bell is attached to a duct of the exhaust manifold, and the frustoconical outlet nozzle is attached to an inlet of the high pressure turbine.

It will be appreciated that the invention is not limited by the above description of embodiments, but that the full scope of the invention includes variations and substitutions apparent to the skilled worker. As will be readily appreciated, in aspects of the present invention, a turbine inlet duct is connected between an exhaust manifold and a high pressure turbine, and the duct is supported by being bolted to an engine cover. As a result, the duct is secured against loads exerted by exhaust gas flow.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §122, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described turbine inlet duct, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A duct, comprising:
a cylindrical duct body defining a longitudinal axis;
a frustoconical outlet nozzle connected at one end of the duct body and extending at from eighty to ninety degrees from the longitudinal axis; and
an inlet bell connected at the other end of the duct body and extending at from forty-five to fifty-five degrees from the longitudinal axis;
wherein the outlet nozzle extends from the longitudinal axis in a first plane, and the inlet bell extends from the longitudinal axis in a second plane that is rotated around the longitudinal axis at about five degrees from the first plane.

2. The duct of claim 1, further comprising legs formed on the duct body and defining holes with axes extending orthogonal to a third plane that is rotated around the longitudinal axis at about twenty degrees from the second plane.

3. The duct of claim 2, further comprising first and second pegs protruding from a lower surface of the duct body orthogonal to the third plane, for engaging the duct body with an engine to which the duct is to be mounted.

4. The duct of claim 3, wherein the first peg is generally square in shape.

5. The duct of claim 3, wherein the second peg has an elongated cross-section.

6. The duct of claim 1, wherein the inlet bell is configured for attachment to an exhaust manifold duct, and the frustoconical outlet nozzle is configured for attachment to an inlet of a high pressure turbine.

7. A duct, comprising:
a cylindrical duct body defining a longitudinal axis;
a frustoconical outlet nozzle connected at one end of the duct body and extending at from eighty to ninety degrees from the longitudinal axis; and
an inlet bell connected at the other end of the duct body and extending at from forty-five to fifty-five degrees from the longitudinal axis;
wherein the frustoconical outlet nozzle includes a first portion with its outer surface tapered inward at about eight and one half degrees, and includes a second portion with its outer surface tapered inward at about four degrees, the second portion disposed tipward from the first portion.

8. The duct of claim 7, wherein the second portion extends from the first portion to the tip of the frustoconical outlet nozzle, and the second portion extends about one quarter the width of the first portion.

9. A system comprising:
an engine having an exhaust manifold;
a high pressure turbocharger operably coupled to the engine and comprising a high pressure turbine and a high pressure compressor;
at least one low pressure turbocharger operably coupled to the high pressure turbocharger; and
a duct having a cylindrical duct body defining a longitudinal axis, a frustoconical outlet nozzle connected at one end of the duct body and extending at from eighty to ninety degrees from the longitudinal axis, and an inlet bell connected at the other end of the duct body and extending at from forty-five to fifty-five degrees from the longitudinal axis;
wherein the inlet bell is attached to a duct of the exhaust manifold, and wherein the frustoconical outlet nozzle is attached to an inlet of the high pressure turbine.

10. An engine comprising:
an exhaust manifold;
an intake manifold;
one or more cylinders arranged to receive intake air from the intake manifold and to discharge exhaust gas to the exhaust manifold;
a turbocharger including a turbine coupled to receive exhaust gas from the exhaust manifold and including a compressor coupled to supply intake air to the intake manifold; and
a turbine inlet duct coupled to conduct exhaust gas from the exhaust manifold to the turbine of the turbocharger, said turbine inlet duct including:
a cylindrical duct body defining a longitudinal axis;
a frustoconical outlet nozzle connected at one end of the duct body and extending at from eighty to ninety degrees from the longitudinal axis, wherein the frustoconical outlet nozzle is connected to the turbine; and
an inlet bell connected at the other end of the duct body and extending at from forty-five to fifty-five degrees from the longitudinal axis, wherein the inlet bell is connected to the exhaust manifold.

11. The engine of claim 10, wherein the outlet nozzle extends from the longitudinal axis in a first plane, and the inlet bell extends from the longitudinal axis in a second plane that is rotated around the longitudinal axis at about five degrees from the first plane.

12. The engine of claim 11, wherein the turbine inlet duct further includes legs formed on the duct body for mounting the duct body to a support of the engine.

13. The engine of claim 12, wherein the turbine inlet duct further includes first and second pegs protruding from a lower surface of the duct body for engaging into holes formed on a cover of the engine.

14. The engine of claim 13, wherein the first peg is generally square in shape.

15. The engine of claim 13, wherein the second peg has an elongated cross-section.

16. The engine of claim 10, wherein the frustoconical outlet nozzle includes a first portion with its outer surface tapered inward at about eight and one half degrees, and includes a second portion with its outer surface tapered inward at about four degrees, the second portion disposed tipward from the first portion.

17. The engine of claim 16, wherein the second portion extends from the first portion to the tip of the frustoconical outlet nozzle, and the second portion extends about one quarter the width of the first portion.

* * * * *